Oct. 21, 1952     A. R. CHASAR     2,614,435
MACHINE TOOL
Filed June 16, 1949                             5 Sheets-Sheet 1
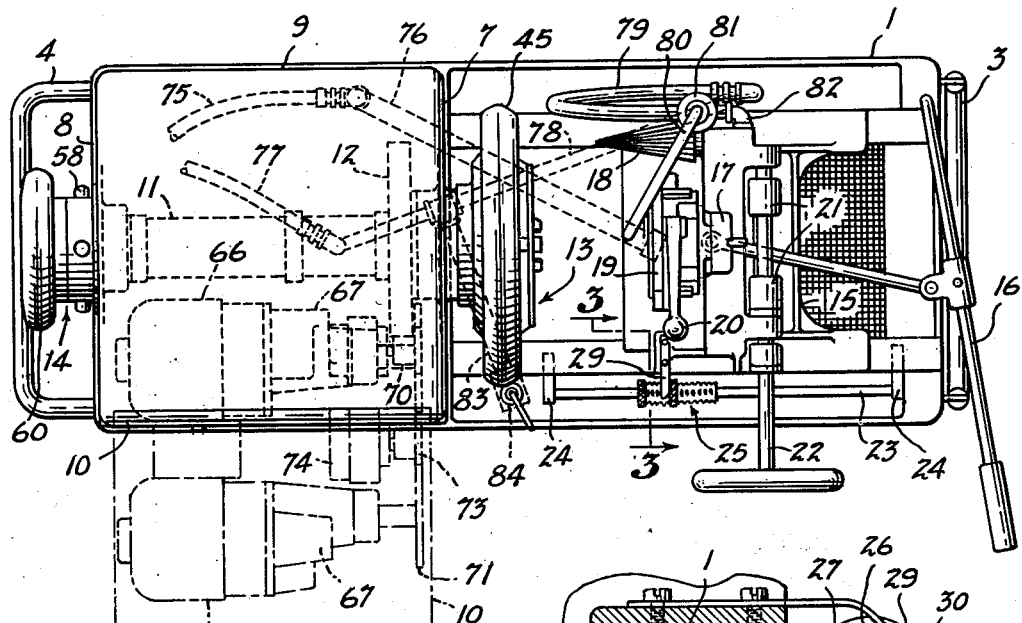
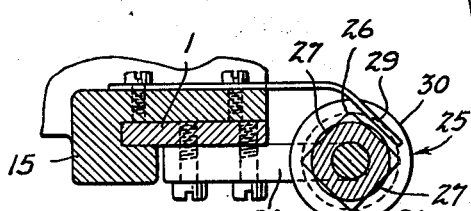
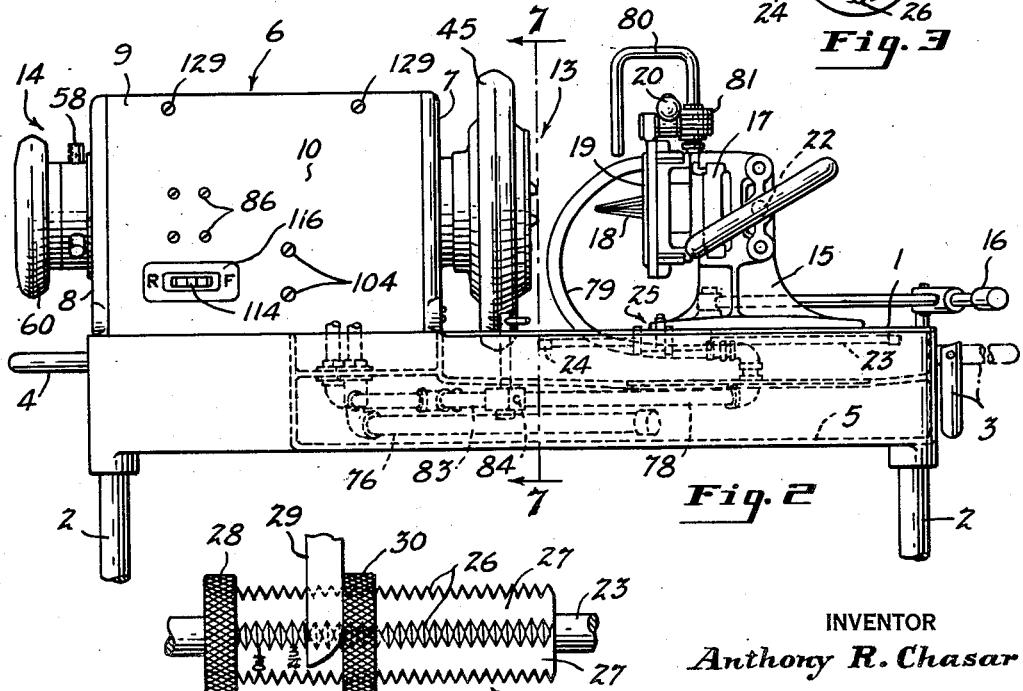
INVENTOR
*Anthony R. Chasar*
BY *Evans & McCoy*
ATTORNEYS

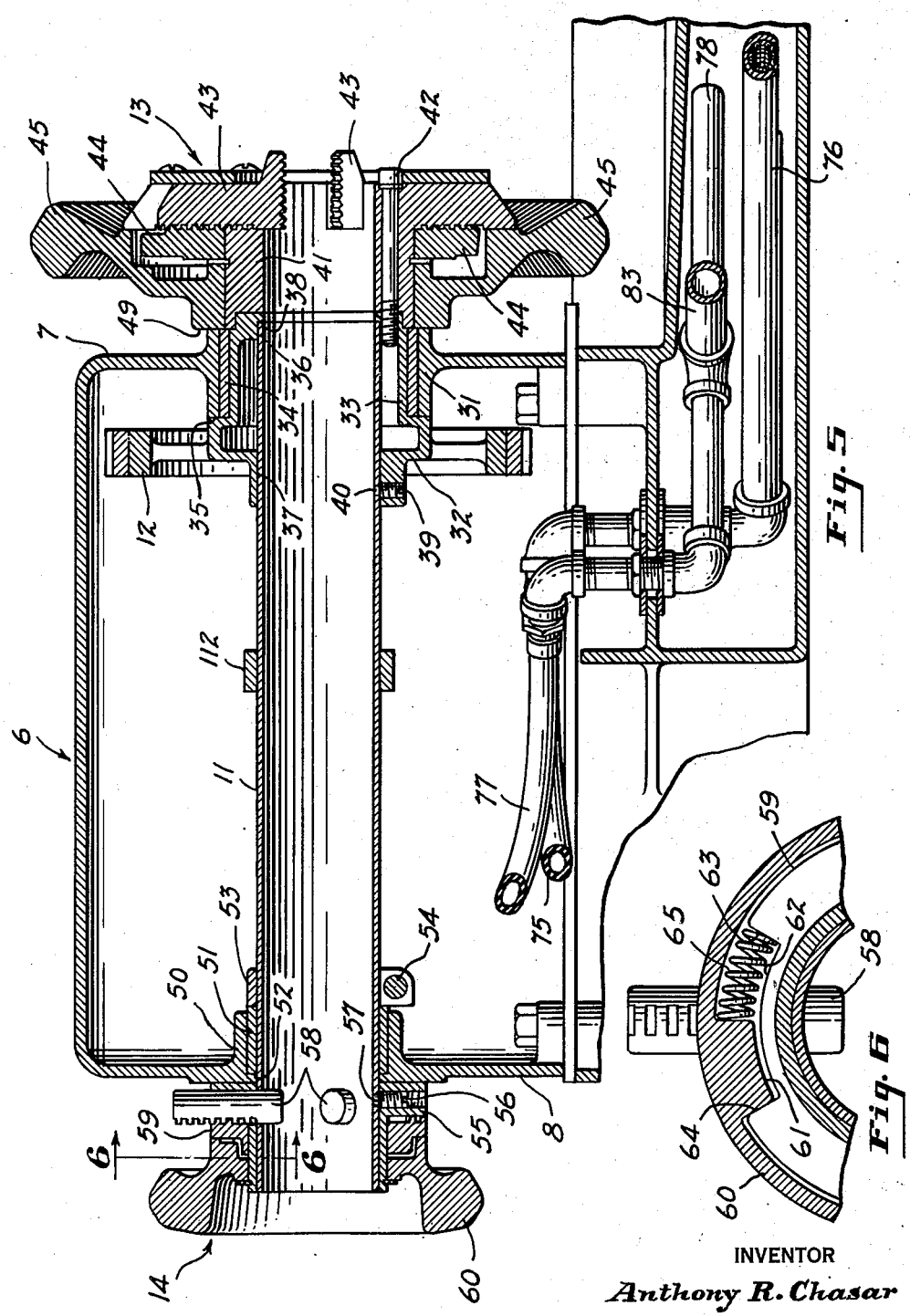

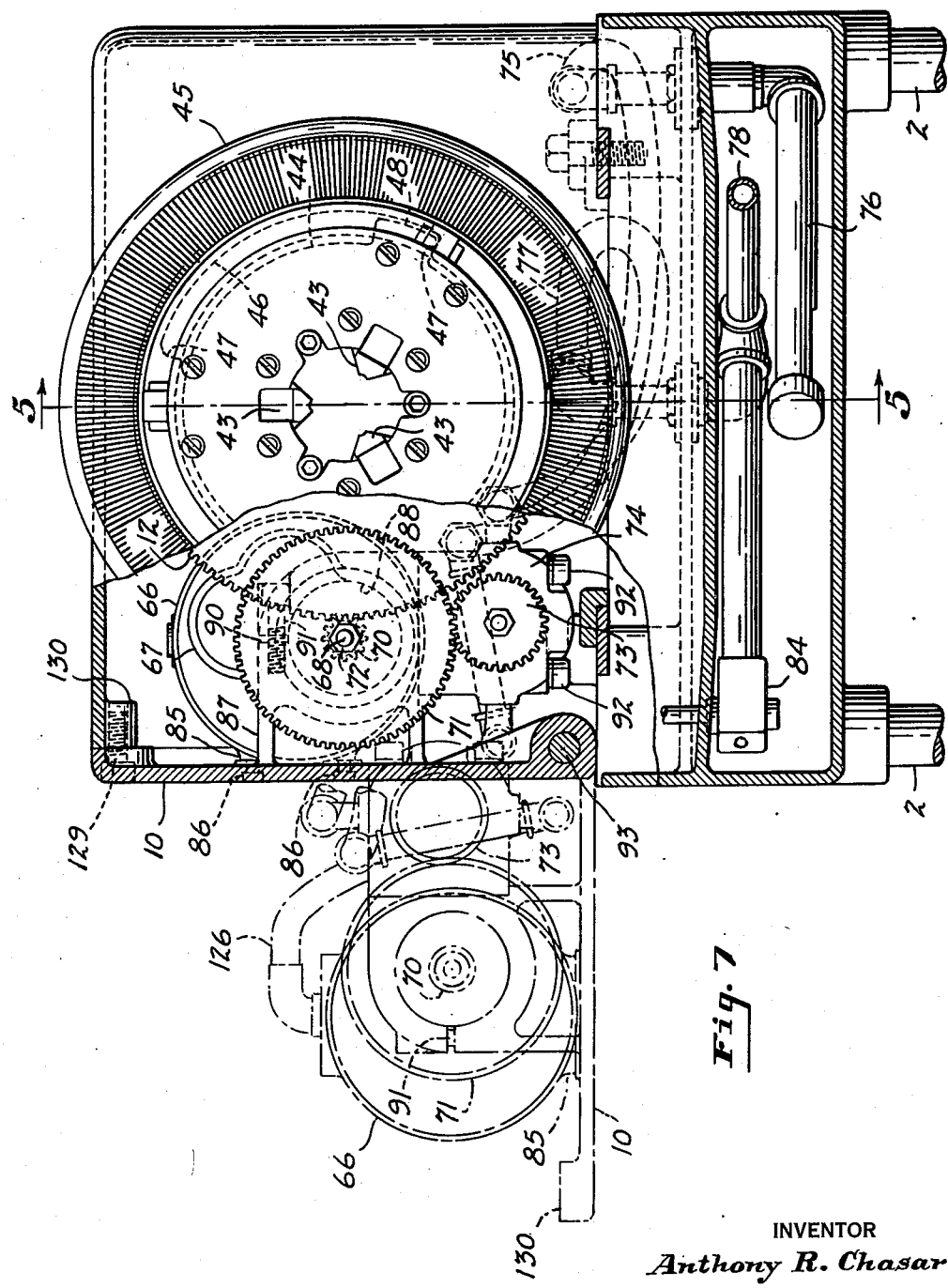

Oct. 21, 1952 — A. R. CHASAR — 2,614,435
MACHINE TOOL
Filed June 16, 1949 — 5 Sheets-Sheet 4

INVENTOR
Anthony R. Chasar
BY Evans & McCoy
ATTORNEYS

Oct. 21, 1952  A. R. CHASAR  2,614,435
MACHINE TOOL
Filed June 16, 1949  5 Sheets-Sheet 5

INVENTOR
Anthony R. Chasar
BY Evans + McCoy
ATTORNEYS

Patented Oct. 21, 1952

2,614,435

UNITED STATES PATENT OFFICE 2,614,435

MACHINE TOOL

Anthony R. Chasar, Cleveland, Ohio, assignor to The Oster Manufacturing Company, Cleveland, Ohio, a corporation of Ohio Application June 16, 1949, Serial No. 99,371

5 Claims. (Cl. 74—405)

This invention relates to machine tools, and particularly to a thread cutting machine having a tubular spindle adapted to receive the pipe or rod to be threaded.

The invention has for its main object to provide a machine in which the spindle and driving mechanism are compactly housed and in which all parts are readily accessible and easily detachable for replacement or repair.

More specifically the invention provides a machine in which the spindle driving mechanism, comprising a motor and reduction gearing, are detachably mounted on a hinged panel forming all or part of one side wall of the spindle housing, the panel being movable from an upright closed position to a horizontal position where the motor and gearing are clear of the spindle and conveniently accessible, the motor and reduction gearing being detachably mounted on the panel so that one driving unit can be readily replaced with another.

It is also an object of the invention to provide a machine in which a lubricant pump is mounted on the hinged panel and geared to the motor, and in which the pump is detachable from the panel independently of the motor.

It is also an object of the invention to provide a machine in which the panel carrying the spindle driving mechanism is adjustable to vary the backlash between the gear on the spindle and a driving gear on the panel unit.

Further objects are to provide a machine of the character described in which the weight of the spindle and the spindle supporting structure is greatly reduced without sacrifice of strength and which can be manufactured at low cost.

The invention also has for an object to provide a machine of the character described in which the spindle and associated parts are readily accessible and are so mounted that they can be quickly and easily assembled or disassembled.

With the above and other objects in view, the invention may be said to comprise the machine as illustrated in the accompanying drawings and hereinafter described, together with such variations and modifications thereof as will be apparent to one skilled in the art to which the invention pertains.

Reference should be had to the accompanying drawings forming a part of the specification, in which:

Figure 1 is a plan view of a thread cutting machine embodying the invention;

Fig. 2 is a side elevation of the machine;

Fig. 3 is a fragmentary section on an enlarged scale, taken on the line indicated at 3—3 in Fig. 1;

Fig. 4 is a side elevation of the gauge shown in Fig. 3;

Fig. 5 is a central vertical longitudinal section taken through the spindle housing on the line indicated at 5—5 in Fig. 7.

Fig. 6 is a fragmentary detail view showing the connection between the actuating hand wheel and the scroll wheel of the centering chuck;

Fig. 7 is a vertical transverse section on an enlarged scale through the machine taken on the line indicated at 7—7 in Fig. 2, a portion of the housing being broken away to show the spindle driving mechanism;

Figure 8:
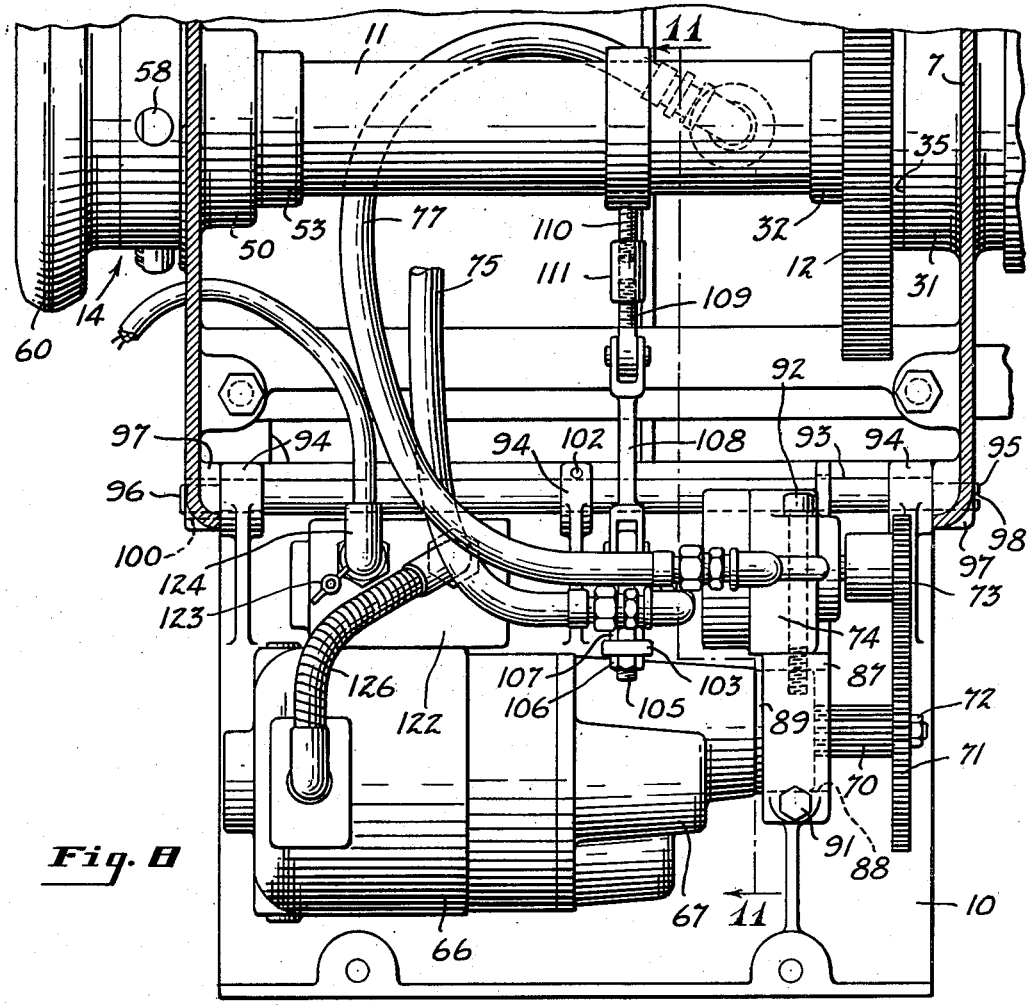
Fig. 8 is a top plan view showing the mechanism supporting side panel of the housing in open position, the top of the spindle housing being broken away to expose parts within the housing.
Figures 9, 10:
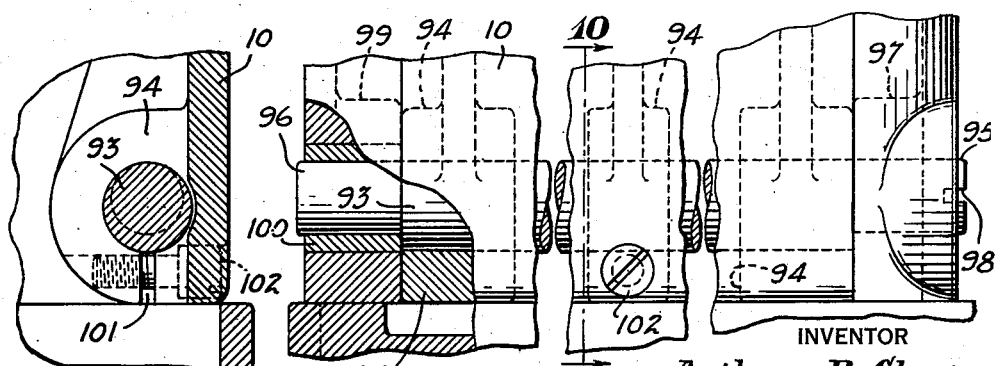
Fig. 9 is a detail view on an enlarged scale showing the hinge connecting the side panel to the housing.
Fig. 10 is a fragmentary section taken on the line indicated at 10—10 in Fig. 9.

In the accompanying drawings the invention is shown applied to a thread cutting machine having an elongated bed or frame 1 carried by suitable supporting legs 2. The machine is preferably portable and is provided with handles 3 and 4 at the front and rear by means of which it may be carried. Within the bed or frame 1 of the machine there is provided a sump or reservoir 5 adapted to contain a supply of lubricant for cooling the work and threading dies during thread cutting operations.

On the rear portion of the bed 1 there is mounted a spindle housing 6 having front and rear walls 7 and 8, a fixed side wall 9 and a hinged panel 10 which forms all or a major portion of the side wall opposite the side wall 9. Extending through the housing 6 centrally thereof there is a tubular spindle 11 to which is attached a large gear 12 through which the spindle is driven. A work clamping chuck 13 is attached to the forward end of the spindle 11 and is positioned immediately in front of the front wall 7 of the housing. Rearwardly of the rear wall 8 the spindle 11 carries a rear centering chuck 14. Forwardly of the chuck 13 a cutter and die head carriage 15 is slidably mounted on the bed 1 for movement toward and away from the chuck 13 in the direction of the axis of the spindle 11.

The carriage can be moved forwardly and rearwardly on the bed 1 by means of a manually operable lever 16 to position the carriage with respect to the work. The carriage 15 has a transversely movable slide 17 on the side thereof facing the chuck 13 which carries a reamer 18 and a threading die 19 both of conventional form, the threading die being provided with the usual manually operable closing lever 20. On the front side thereof the carriage 15 has a cut-off attachment 21 that is adjustable by means of an actuating screw 22, as is common practice in pipe threading machines.

At one side of the bed 1 a rod 23 is secured at its ends to brackets 24 attached to the bed and is disposed parallel to a line of movement of the carriage 15. The rod 25 provides a support for an indicating member 25 in the form of a polygonal screw that is slidably and rotatably mounted thereon. The indicating member is provided with corner threads 26 and has a series of flat longitudinal faces 27 that are provided with scales graduated to different thread pitches. The member 25 has a knurled head 28 at one end by means of which it may be turned on the rod 23.

A resilient pointer 29 is attached at its inner end to the carriage 15 and has an outer end portion closely overlying the member 25. The pointer 29 is engaged by corner portions of the polygonal member 25 when the member 25 is turned and serves to normally prevent turning movement of the member 25. The pointer 29 is yieldable to permit the member 25 to be turned by means of the knurled head 28 to bring the desired graduated face 27 into juxtaposition with the pointer. The indicating member 25 is initially positioned on the rod 23 by means of a nut 30 threaded on the member 25 and engageable with the pointer 29. By adjusting the nut 30 and engaging the front edge of the pointer with the nut, any desired graduation of the scale beneath the pointer 29 can be brought into registry with the rear edge of the pointer to indicate the extent of movement of the carriage 15 necessary to produce the desired length of thread on the pipe or rod being threaded.

As best shown in Fig. 5 of the drawings, the front wall 7 of the spindle housing has a bearing boss 31 and the gear 12 has a hub 32 with a forwardly extending bearing portion 33 that is journaled in a sleeve 34 mounted in the boss 31, the hub being provided with a shoulder 35 overlying the inner side of the boss 31 to position the gear with respect to the housing wall. The hub 32 has longitudinally spaced interiorly cylindrical portions 36 and 37 in which the tubular spindle 11 fits, and is provided with a stop shoulder 38 against which the forward end of the spindle bears. The hub 32 is detachably secured to the spindle 11 by any suitable means such as a radially disposed screw 39 that engages in an opening 40 in the spindle 11.

The chuck 13 has a body portion 41 that is detachably and rigidly secured by means of axial attaching bolts 42 to the hub 32 of the gear 12. Radially movable jaws 43 are mounted in the body 41 and these jaws are simultaneously actuated by means of a scroll wheel 44. The scroll wheel 44 is actuated by a hammer action hand wheel 45 that is provided with an internal circumferential slot 46 overlying the periphery of the scroll wheel 44 and having hammering shoulders 47 at its opposite ends which are engageable with a lug 48 on the scroll wheel which projects into the slot.

The rear wall 8 of the housing has a bearing boss 50 around its spindle receiving opening which receives a bearing sleeve 51 in which the spindle 11 is journaled. The boss is provided with a shoulder 52 against which the rear end of the sleeve 51 fits, and the forward end of the sleeve 51 is engaged by a collar 53 that is clamped to the spindle 11. The collar 53 is transversely split and has a clamping bolt 54 extending across the split to clamp the collar to the spindle. To remove the spindle it is only necessary to loosen the screw 39 attaching the spindle to the gear 12 and to loosen the bolt 54, after which the tubular spindle 11 can be withdrawn through the rear wall 8.

By reason of the fact that the driving torque is transmitted directly through the gear 12 to the main chuck 13, the spindle 11 is not subjected to driving torque and may be relatively thin walled. The spindle 11, however, effectively resists lateral stresses tending to move the main chuck about axes transverse to the spindle axis, thereby relieving the stresses that would otherwise be taken by the front wall of the housing so that the relatively light housing provides a rigid support for the work holding chuck. The present invention effects a substantial lightening of the spindle and the spindle supports, thereby lessening the weight of the machine and reducing the cost of manufacture.

The rear centering chuck 14 is mounted on the rear end of the tubular spindle 11 immediately to the rear of the rear wall 8 of the housing, and this chuck has a body portion 55 secured to the spindle 11 by suitable means such as an attaching screw 56 that engages with an opening 57 in the spindle. The chuck 14 has radially movable jaws 58 slidably mounted in the body 55, and these jaws are actuated by means of a scroll wheel 59 operated by a hand wheel 60. The hand wheel 60 has a lug 61 that projects into a circumferential slot 62 in the scroll wheel 59, the slot 62 having end shoulders 63 and 64 through which thrust may be transmitted by the hand wheel to the scroll wheel. Since the chuck 14 merely serves to center the work and does not transmit a torsional thrust to the work, it is desirable that the chuck 14 grip the work lightly and be quickly and easily released.

In order to insure a relatively light gripping engagement with the work, a spring 65 is interposed between the lug 61 and the shoulder 63 so that the thrust moving the jaws 58 radially inwardly into clamping engagement with the work is transmitted through the spring. There is, however, a hammer action between the lug 61 and the shoulder 64 of the scroll wheel so that by impact of the lug 61 against the shoulder 64 the clamping jaws 58 may be instantly released.

The work spindle is driven by an electric motor 66 which is mounted upon the hinged panel 10 and which has a gear housing 67 attached to the forward end thereof. A horizontal shaft 68 eccentric to the motor 66 projects forwardly from the gear housing 67 and is driven from the motor through reduction gearing 69 in the housing 67. The shaft 68 has a small gear 70 attached thereto which meshes with the gear 12 when the panel 10 is in its upright position. At its forward end the shaft 68 has a gear 71 detachably secured thereto by means of a nut 72 and this gear, which is considerably larger than the gear 70, meshes with a gear 73 which drives a pump 74 also mounted on the panel 10. The pump 74 is employed to deliver a liquid coolant or cutting lubricant to the portion of the work being acted upon by the threading dies or reamer, the lubricant being pumped from the sump 5 and draining back into the sump 5. The pump 74 is preferably of the automatic reversing type, pumping liquid in the same direction regardless of its direction of rotation, so that the motor may be reversed for cutting right or left hand threads without affecting the operation of the pump.

A flexible hose 75 connects the pump inlet with a pipe 76 leading to the sump 5, and a flexible hose 77 connects the pump outlet to a pipe 78 which is connected by a flexible hose 79 to a lubricant delivery spout 80 mounted on the carriage 15. The spout 80, as best shown in Figs. 1 and 2, is in the form of a rigid U-shaped tube that is connected by a universal friction joint 81 to a fitting 82 on the carriage 15 which connects the spout to the flexible tube 79. The spout 80 is frictionally retained in any position of angular adjustment to which it may be moved manually. A branch pipe 83 connects the pipe 78 to the sump 5 and this branch pipe, which forms a lubricant bypass, is provided with a valve 84 which may be opened and closed to control the flow of lubricant to the spout 80. Opening of the valve 84 bypasses the liquid from the pipe 78 to the sump 5 and interrupts the delivery of liquid to the spout 80. Closing the valve 84 causes the liquid to be discharged through the spout 80.

The motor 66 has a base 85 that is detachably secured to the panel 10 by bolts 86. A bracket 87 formed integrally with the panel 10 is provided with a round opening 88 which receives the cylindrical forward end 89 of the gear housing 67. A portion of the bracket 87 encircling the portion 89 of the housing is split transversely at 90 as best shown in Fig. 7, and a clamping bolt 91 extends across the split to tightly clamp the cylindrical portion 89 of the housing.

The pump 74, which is positioned beneath the gear housing 67 when the panel is in its upright position, is detachably secured to the bracket 87 by means of bolts 92. By releasing the bolts 92 the pump 74 may be detached from the panel independently of the motor 66 and by loosening the clamping bolt 91, removing the attaching bolts 86, and detaching the gear 71 the motor 66 with the gear housing 67 is removable from the panel independently of the pump.

The flexible hose connections 75 and 77 are detachably connected to the pump so that the pump can be quickly and easily replaced when desired, all of the attaching devices for the pump and motor being conveniently accessible when the panel 10 is moved to its open horizontal position as shown in Figs. 7 and 8.

The hinge connecting the lower portion of the panel 10 to the spindle housing includes a hinge pin 93 that passes through knuckles 94 formed integrally with the panel 10 adjacent its lower edge. The pin 93 has axially alined end portions 95 and 96 that are of smaller diameter than the body of the pin, and which are eccentrically disposed with respect to the body of the pin. The end portion 95 of the hinge pin is journaled in a boss 97 formed integrally with the front wall 7 of the housing and is provided with a slot 98 adapted to receive a screw driver for imparting a turning movement to the hinge pin. The opposite end portion 96 of the hinge pin is received in a boss 99 integral with the rear wall 8 of the housing, the boss 99 having an opening of greater diameter than the body of the hinge pin 93 and having a bearing sleeve 100 which may have a press fit therein and which provides a journal for the end portion 96 of the hinge pin. One of the knuckles 94 has a transverse slot 101 opening to the hinge pin receiving opening, and the slot 101 is bridged by a clamping bolt 102 which serves to clamp the hinge pin 93 against turning movement in the panel 10. By loosening the bolt 102 the hinge pin may be turned by means of a screw driver engaging in the slot 98 to adjust the lower portion of the panel inwardly or outwardly to provide the desired backlash between the gears 12 and 7. When the clamping bolt 102 is released, the hinge pin 93 may be driven endwise through the opening of the boss 99 of the rear wall to detach the panel 10 from the spindle housing so that both the pump and the driving mechanism may be removed as a unit from the housing and replaced with an identical unit, so that the operation of the machine need not be interrupted for any substantial period of time when repairs are necessary.

Figure 11:
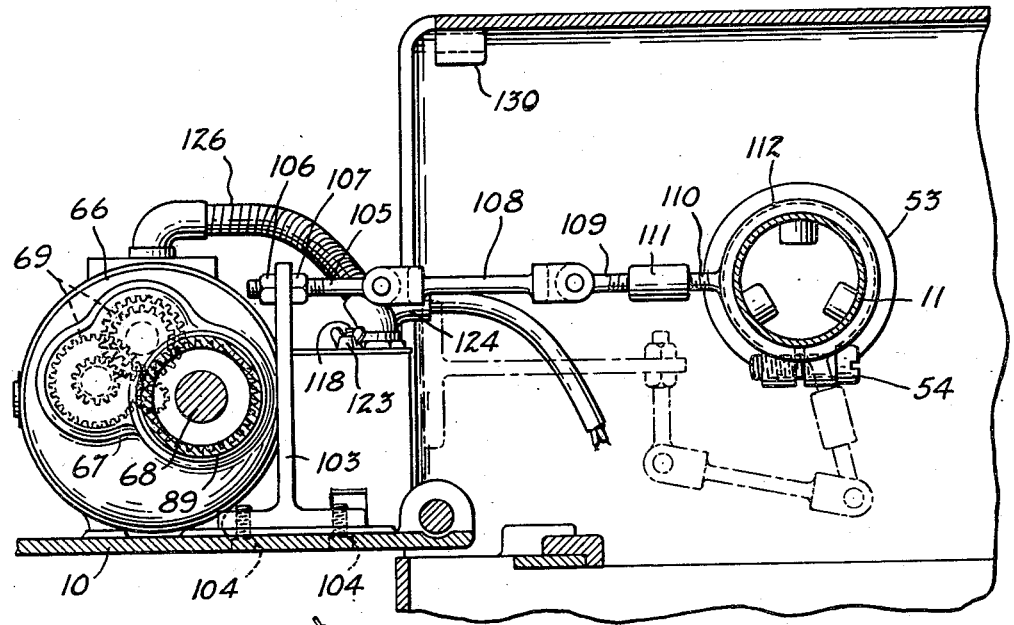
Fig. 11 is a transverse vertical section through the spindle housing, with the hinged panel in horizontal position, taken on the line indicated at 11—11 in Fig. 8.
Figures 12, 13:
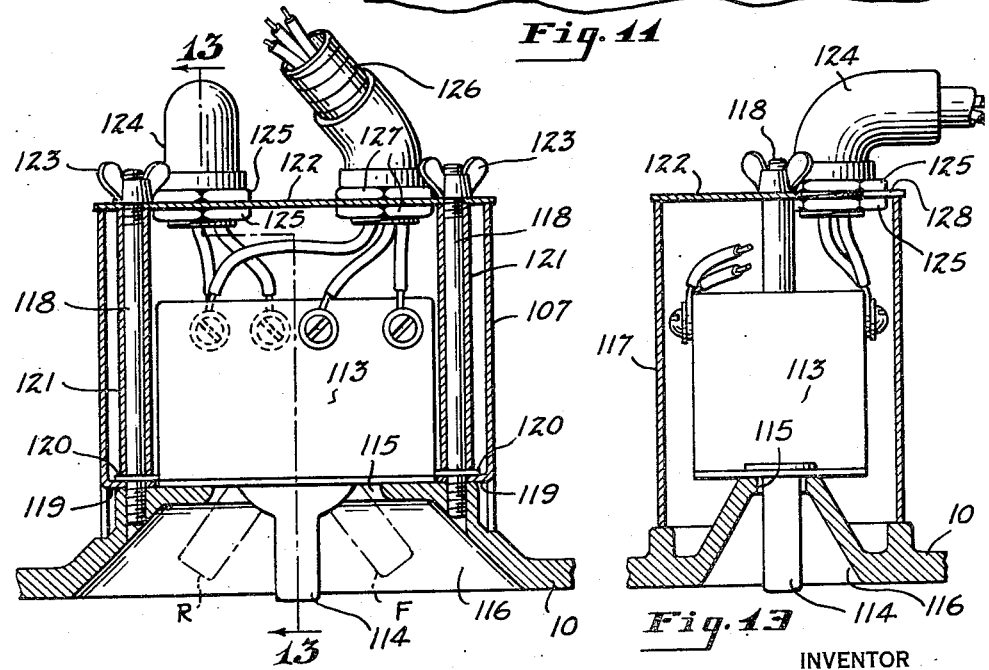
Fig. 12 is a fragmentary horizontal section showing the motor controlling switch.
Fig. 13 is a vertical section taken on the line indicated at 13—13 in Fig. 12.

As best shown in Fig. 11, a bracket 103 is detachably secured by means of bolts 104 to the inner face of the panel 10, and this bracket has rigidly attached thereto an eye bolt 105 which is rigidly clamped to the bracket 103 by means of nuts 106 and 107 and which extends vertically downwardly from the bracket when the panel 10 is in upright closed position, as shown in dotted lines in Fig. 11, and which extends horizontally inwardly from the bracket at substantially the level of the axis of the spindle 11 when the panel is in open horizontal position, as shown in full lines in Fig. 11. The eye bolt 105 is connected to the spindle 11 by a toggle which limits the outward movement of the bracket 103 and which serves to support the panel in horizontal position when it is swung outwardly. The connecting toggle has an outer link 108 pivoted to the eye bolt 105 and an inner toggle composed of sections 109 and 110 connected by a turnbuckle 111. The inner section 110 has an integral ring 112 that has a loose fit on the spindle 111 permitting rotation of the spindle 111 and providing a pivot for the inner link of the toggle which swings about the axis of the spindle. By adjusting the bolt 105 and the turnbuckle 111 the extent of swinging movement of the panel 10 may be regulated.

The motor 66 is controlled by a reversing switch 113 which has an arm 114 projecting through a slot 115 in the panel 10 which opens to a recessed portion 116 in the outer face of the panel. The switch 113 is detachably secured to the housing within a housing 117 and the housing and switch are detachably secured to the inner face of the panel by means of bolts 118 that are screwed into the panel and that receive lugs or flanges 119 and 120 that are integral with the housing and switch. The lugs 119 and 120 are on the portions of the housing and switch that abut the inner face of the panel 10, and are held in place against the panel by means of tubes 121 that fit over the bolts 118 and that are engaged at their outer ends by a housing cover plate 122. Wing nuts 123 clamp the cover plate to the outer ends of the tubes 121, which in turn clamp the switch and housing to the panel 10. An extension cord attachment 124 is detachably secured by means of clamping nuts 125 to the cover 122 and a flexibly conducted conduit 126 which extends from the housing 117 to the motor 66 is detachably secured by means of clamping nuts 127 to the cover. Suitable connections are made between the conductors of the extension cord and the motor and switch through the conductor conduit 126 and attaching member 124. In order to facilitate detachment of the cover plate 122 from the conduit 126 and connecting member 124 the cover plate 122 is provided with slots 128 which permit detachment of the cover plate from the attaching member and conduit when the clamping nuts 125 and 127 are loosened.

During operation of the machine the panel 10 is rigidly secured in a fixed upright closed position by means of clamping bolts 129 extending through the panel into bosses 130 formed integrally with the top wall of the housing.

It will be apparent that the present invention provides a machine tool of economical construction and relatively light weight which can be quickly and easily assembled and in which all parts are readily accessible for replacement or repair, and in which the mechanisms most frequently requiring repair can be quickly and easily removed and replaced with mechanisms in proper running order.

It is to be understood that in accordance with the provisions of the patent statutes, variations and modifications of the specific devices herein shown and described may be made without departing from the spirit of the invention.

What I claim is:

1. In a machine tool, a housing having upright front, rear and side walls, one of said side walls comprising a panel hinged to swing outwardly about a horizontal axis adjacent its bottom edge, means for releasably fastening said hinged panel in upright closed position, means for supporting said hinged panel in horizontal open position, a spindle journaled in said front and rear walls and spaced from said hinged panel, a gear fixed to said spindle within the housing, and a driving unit detachably secured to the inner side of said hinged panel and movable with said panel, said unit comprising a motor, a shaft driven by the motor and parallel to said spindle, a gear fixed to said shaft that moves into and out of mesh with the gear on said spindle when said hinged panel is moved to and from its closed position, said unit being laterally clear of the housing and accessible for removal when the said panel is in its horizontal position.

2. In a machine tool, a housing having upright front, rear and side walls, one of said side walls comprising a panel hinged to swing outwardly about a horizontal axis adjacent its bottom edge, means for releasably fastening said hinged panel in upright closed position, means for supporting said hinged panel in horizontal open position, a spindle journaled in said front and rear walls and spaced from said hinged panel, a gear fixed to said spindle within the housing, a motor detachably mounted on the inner face of said hinged panel, a gear housing carried by said motor, a shaft mounted in said gear housing and driven by said motor, a gear fixed to said shaft and movable with the panel into and out of mesh with the gear on said spindle as the panel is moved to and from its closed position, and means for adjusting said hinged panel in the closed position thereof toward and away from said spindle to regulate the back lash of said gears.

3. In a machine tool, a housing having upright front, rear and side walls, one of said side walls comprising a hinged panel movable from an upright closed position to a horizontal open position, a horizontal hinge pin connecting the lower edge portion of said panel to the housing, said pin having axially alined end portions journaled in said housing and an intermediate portion eccentric to said end portions, means for releasably clamping said eccentric portion to said panel in different positions of angular adjustment with respect to said end portions, driving means including a motor and a gear driven by said motor mounted upon the inner side of said hinged panel, a spindle journaled in said front and rear walls, a gear fixed to said spindle and positioned to mesh with said motor driven gear when said hinged panel is in upright closed position, and means for releasably securing said hinged panel in closed position.

4. In a machine tool, a supporting frame, a housing mounted on said frame and comprising front, rear and side walls, one of said side walls comprising a panel hinged to swing outwardly from its closed position, a spindle journaled in said front and rear walls and spaced from said hinged panel, a gear fixed to said spindle within the housing, spindle driving means comprising a motor and a gear driven by said motor, both mounted on and movable with said panel, said motor and said driven gear being positioned between said spindle and panel and said driven gear meshing with the spindle gear when said panel is in closed poosition and moving out of mesh with the spindle gear when said panel is swung outwardly, a collar rotatably mounted on said spindle, a toggle connecting said collar and said panel to limit swinging movement of the panel, and means for releasably securing said panel in closed position.

5. In a machine tool, a supporting frame, a housing mounted on said frame and comprising front, rear and side walls, one of said side walls comprising a panel hinged to swing outwardly from its closed position, a spindle journaled in said front and rear walls, a gear fixed to said spindle within the housing, spindle driving means comprising a motor and a gear driven by said motor, both mounted on and movable with said panel, said motor driven gear meshing with the spindle gear when said panel is in closed position and moving out of mesh with the spindle gear when said panel is swung outwardly, means for limiting the swinging movement of said panel, means for releasably securing the panel in closed position, and means for adjusting said panel with respect to its hinge axis to regulate the back lash of said gears.

ANTHONY R. CHASAR.

REFERENCES CITED

The following references are of record in the file of this patent:

UNITED STATES PATENTS

| Number | Name | Date |
| --- | --- | --- |
| 322,854 | Rodgers | July 21, 1885 |
| 1,433,125 | Edmands | Oct. 24, 1922 |
| 1,943,643 | Vosper | Jan. 16, 1934 |
| 1,970,276 | Bullard | Aug. 14, 1934 |
| 2,137,850 | Miller | Nov. 22, 1938 |
| 2,193,279 | Groene | Mar. 12, 1940 |
| 2,270,358 | Tewksbury | Jan. 20, 1942 |
| 2,438,465 | Strauss et al. | Mar. 23, 1948 |
| 2,556,740 | Polsen et al. | June 12, 1951 |